J. M. PERKINS.
FRUIT JAR LIFTER.
APPLICATION FILED JAN. 17, 1918.
1,320,268.
Patented Oct. 28, 1919.
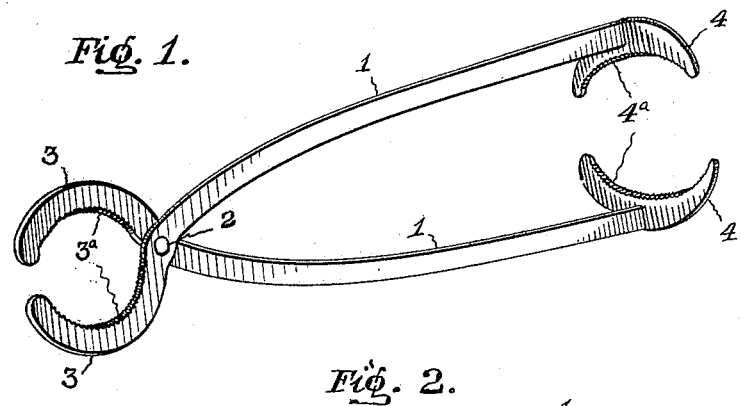
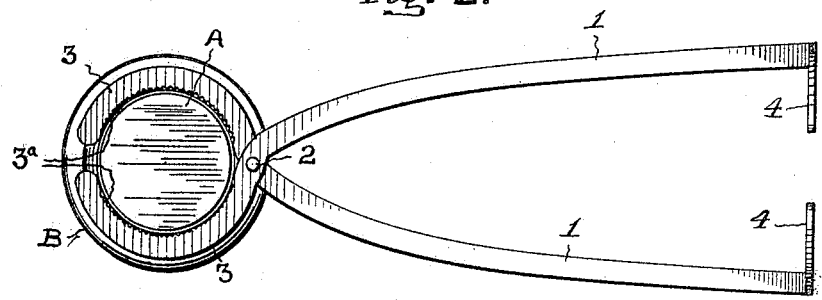
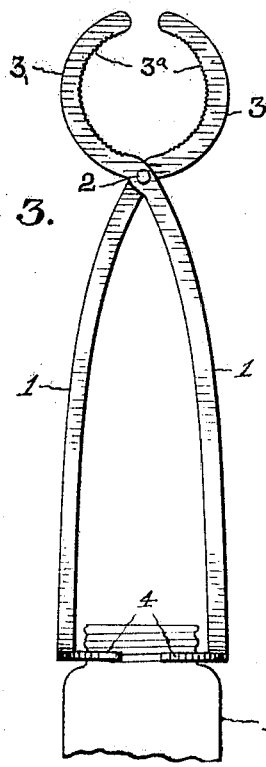
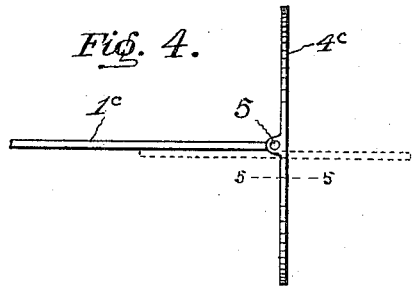
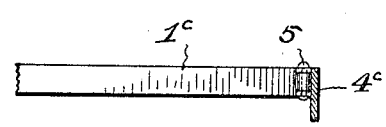
Inventor
J. M. PERKINS —
By H. S. Hill
Attorney

UNITED STATES PATENT OFFICE.

JAMES M. PERKINS, OF MAUD, OKLAHOMA.

FRUIT-JAR LIFTER.

1,320,268.         Specification of Letters Patent.         Patented Oct. 28, 1919.

Application filed January 17, 1918. Serial No. 212,243.

*To all whom it may concern:*

Be it known that I, JAMES M. PERKINS, a citizen of the United States, residing at Maud, in the county of Pottawatomie, State of Oklahoma, have invented a new and useful Fruit-Jar Lifter; and I do hereby declare the following to be a full, clear, and exact description of the invention, such as will enable others skilled in the art to which it appertains to make and use the same.

The present invention relates to a combination fruit jar lifter and wrench, and has for its object to provide a device of this character which embodies novel features of construction whereby it can be used with equal facility for loosening and removing the screw threaded cover of a jar, or for lifting the jar from hot water or the like without touching the same with the fingers.

Further objects of the invention are to provide a device of this character which is comparatively simple and inexpensive in its construction, which can be readily manufactured in quantities and sold at a nominal cost, which can be easily manipulated, and which will be a very useful article in the kitchen.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Figure 1 is a perspective view of a combination fruit jar lifter and wrench constructed in accordance with the invention.

Fig. 2 is a top plan view of the same, showing it as applied to the cover of a fruit jar for unscrewing the same.

Fig. 3 is a side elevation of the device, showing it as applied to the top of a fruit jar for the purpose of lifting the jar.

Fig. 4 is a top plan view of the rear end of one of the handle members, showing a slight modification in which the transversely disposed lifting jaw is pivotally mounted so that it can be swung into the plane of the handle member when not in use.

Fig. 5 is a sectional view on the line 5—5 of Fig. 4.

Corresponding and like parts are referred to in the following description and indicated in all the views of the drawings by the same reference characters.

Referring to the drawings, which illustrate one embodiment of the invention, the numerals 1 designate a pair of similar and complemental lever members which are pivotally connected at one end upon the pivot pin 2. At the pivot end of the tool the hand levers 1 are crossed and terminate in the opposed curved jaw members 3 which are suitably shaped to fit around and grip the cover of a standard fruit jar. The gripping faces of the jaws are preferably toothed or serrated, as indicated at $3^a$ in order that there may be no difficulty in obtaining a firm grip upon the fruit jar cover. The rear ends of the hand levers 1 are provided with transversely disposed opposed and complemental lifting jaws 4. These lifting jaws are arranged in a plane at right angles to that of the hand levers and have the gripping faces thereof toothed or serrated, as indicated at $4^a$, and suitably curved to conform to the shape of the cover A of a fruit jar B.

The cover removing jaws 3 are disposed in the plane of the hand levers 1, and in order to unscrew the cover A from the jar B, the tool is positioned in a plane transverse to the axis of the jar and the jaws 3 caused to grip the cover, as indicated by Fig. 2. The hand levers 1 enable the jaws 3 to be forced into a tight gripping engagement with the cover, and also provide a strong leverage for rotating the cover to loosen it from the jar and unscrew it therefrom. When it is desired to use the tool for lifting a fruit jar from a pan of hot water or the like, the tool is positioned above the jar in substantial alinement with the axis thereof and the lifting jaws 4 brought into engagement with the grooved neck of the jar B, as indicated by Fig. 3. The hand levers 1 may then be gripped at a point below the pivot pin 2 and the tool caused to grip the jar with sufficient force to enable the jar to be lifted. With this tool fruit jars can be easily lifted from pans of hot water or the like and handled when in a hot condition without any danger of burning the fingers.

A slight modification is shown by Figs. 4 and 5, in which the lifting jaw $4^c$ is pivotally connected by a pin 5 to the hand lever $1^c$. When it is desired to use the jar lifting jaws $4^c$ they are swung into a position at right angles to the hand levers, as indicated by full lines on Fig. 4, while when the jaws are not in use they can be swung about the pivot pins 5 into substantial alinement with the hand levers 1, as indicated by dotted lines on Fig. 4, thereby enabling the tool to be more easily handled and packed. While the various parts of the tool have been illustrated as formed of heavy sheet material, yet it will be understood that the members may be formed of twisted wire or constructed in any other desired manner, without departing from the spirit of the invention. The jaws 4 may engage either the cover of the fruit jar or the groove at the base of the threaded neck of the fruit jar. In either instance it is essential that the gripping edges 4ª of these jaws be offset inwardly from the inner edges of the handles 1 in order that the handles will not come into contact with the sides of the jar neck or cover and prevent the jaws from tightly gripping the neck or cover in the necessary manner. This result can be accomplished either by bending the ends of the levers 1 inwardly toward each other, or by causing the gripping edges 4ª of the jaws 4 to extend inwardly beyond the edges of the levers 1, as indicated on the drawing.

Having thus described the invention, what I claim as new and desire to secure by Letters Patent, is:—

A tool of the character described including a pair of complemental hand levers which are formed of flat strips of material and cross each other at an intermediate point, a pivotal connection at the crossing of the hand levers, and transversely disposed complemental and opposed jar lifting jaws carried by the ends of the hand levers and also formed of flat material, said lifting jaws being pivotally connected to the ends of the hand levers by hinge joints arranged at right angles to the longitudinal axes of the hand levers and lifting jaws so that the lifting jaws can either be folded against the sides of the levers or moved into position at right angles thereto, the tool being substantially flat when the jaws are folded against the handles.

In testimony whereof I have signed my name to this specification in the presence of two subscribing witnesses.

JAMES M. PERKINS.

Witnesses:
J. E. SIMPSON,
S. L. LUER.

Copies of this patent may be obtained for five cents each, by addressing the "Commissioner of Patents, Washington, D. C."